UNITED STATES PATENT OFFICE 2,082,275

SUBSTITUTED BETAINES

Karl Daimler and Carl Platz, Frankfort-on-the-Main, Germany, assignors to General Aniline Works, Inc., New York, N. Y., a corporation of Delaware No Drawing. Application April 22, 1935, Serial No. 17,744. In Germany April 26, 1934

5 Claims. (Cl. 260—25)

The present invention relates to substituted betaines.

We have found that substituted betaines of the following general formula

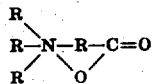

wherein one R stands for an aliphatic radical with at least 6 carbon atoms and the other R's stand for aliphatic, aliphatic-aromatic and aromatic radicals, may be obtained by reacting tertiary amines with halogen carboxylic acids. As tertiary amines there may be mentioned, for instance: trimethylamine, triethylamine, triethanolamine, trihexylamine, hexyldimethylamine, dodecyldimethylamine, dodecyldibutylamine, dodecylmethylbenzylamine, tetradecylethylaniline, hexadecyldioxethylamine and octadecenyldimethylamine. Instead of these pure amines there may also be used technical mixtures obtainable, for instance, from natural fatty acid mixtures, for instance, from fatty acids of palm nut oil or coco nut oil or fish oil. As halogen carboxylic acids there may be mentioned monochloracetic acid, beta-chloropropionic acid. beta-chloro-butyric acid, 10-bromostearic acid. The above mentioned carboxylic acids are advantageously caused to react in the form of their salts with the tertiary amines in an aqueous solution.

The products corresponding with the above formula may also be obtained by alkylating at the nitrogen atom amines containing carboxyl groups. Thus, for instance, dodecylamino acetic acid may be transformed into the betaines of dodecyldimethylamine by treating it with dimethylsulfate or chloromethyl. It is, however, necessary that the final product contains at the nitrogen atom at least 1 aliphatic radical of at least 6 carbon atoms.

As betaines of the above general formula there may be mentioned, for instance: the betaine obtainable by reaction of sodium chloracetate with dodecyldimethylamine; the betaine obtainable by reaction of sodium chloracetate with an amine prepared in the following manner: coco nut oil fatty acid or palm nut oil fatty acid is transformed into the corresponding nitrile, the nitrile is reduced to form the amine and the amine thus obtained is converted into a tertiary amine; furthermore, the betaine obtainable by reaction of sodium chloracetate with hydroxypropyl-methyldodecylamine; the betaine obtainable as follows: hardened fish oil fatty acid of the iodine number 60 is transformed into the corresponding nitrile and the nitrile is reduced in known manner to the amine. This amine is then caused to react with potassium monochloracetate in an aqueous solution and transformed into the betaine by means of dimethylsulfate or chloromethyl; furthermore, the betaine obtainable by reaction of methyl-dodecylbenzylamine with beta-chloropropionic acid; the betaine obtainable by reaction of trimethylamine with 10-bromo-stearic acid.

The new compounds have a very good solubility in water, a high stability towards acids and lyes and a remarkable insensitiveness towards electrolytes. They are, furthermore, distinguished by a high stability towards the salts that cause the hardness of water. The products may be used as agents for washing all sorts of textiles and, in view of their good levelling power, as auxiliary agents, for instance, in the dyeing of vat dyestuffs for stripping dyeings; for dissolving dyestuffs. The products may be used either alone or mixed with additions, for instance, inorganic salts, bleaching or reducing agents.

The following examples serve to illustrate the invention, but they are not intended to limit it thereto; the parts are by weight unless otherwise stated:

1.—94.5 parts of chloracetic acid are finely distributed in 36 parts of water and neutralized with a solution of 40 parts of caustic soda in 36 parts of water, whereupon 213 parts of dodecyldimethylamine is added to this solution, the whole is then heated for some hours at 70° C. to 80° C. A transparent paste-like mass is obtained which is soluble in water to a clear solution and has the following constitution:

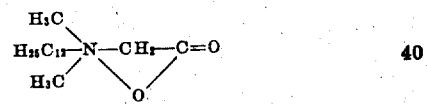

The product may be dried in the usual manner to form a soap-like preparation. The mass may also be liquefied by adding a small quantity of alcohol and a solution is obtained which contains about 35 percent. of active substance. It is very well adapted for being used as liquid hairwash and is fully effective also in sea-water. Instead of the pure dodecyldimethylamine there may also be used an amine prepared as follows: coco nut oil fatty acid is transformed into the nitrile, the nitrile is reduced to the amine and the amine is converted into the tertiary amine.

Cuprammonium silk is dyed in a solution containing per liter 0.5 per cent. of the dyestuff No. 1,228 (Schultz, Farbstofftabellen, 7th edit.), 0.5 per cent. of dyestuff obtainable according to German Patent No. 240,080 (calculated upon the weight of the goods), 1 gram of the product obtainable according to the above process, 15 cc. of caustic soda solution of 38° Bé. and 2 grams of hydrosulfite. Dyeings of good evenness are obtained.

Cotton yarn is dyed in a solution containing per liter 0.5 per cent. of the dyestuff obtainable according to German Patent No. 483,154 (calculated upon the weight of the goods), 1.5 grams of the product obtainable according to the above process, 15 cc. of caustic soda solution of 38° Bé. and 2 grams of hydrosulfite. An excellent dyeing of good evenness is obtained.

2.—257 parts of hydroxypropylmethyldodecylamine, 40 parts of caustic soda and 94.5 parts of chloracetic acid are heated for some hours at 70° C. to 80° C. in 783 parts of water, until the originally completely turbid emulsion has been transformed into a clear mass wholly soluble in water. This preparation which has the following general constitution:

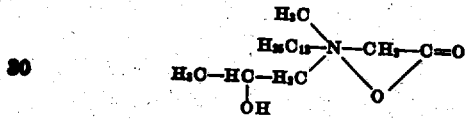

is adapted either alone or mixed with additions, for instance, sodium carbonate, as cleansing agent for washing white linen goods.

Viscose artificial silk is dyed in a solution containing per liter 0.5 per cent. of the dyestuff 1,265 (Schultz, Farbstofftabellen, 7th edit.), calculated upon the weight of the goods, 1 gram of the product obtainable according to the above process, 15 cc. of caustic soda solution of 38° Bé. and 2 grams of hydrosulfite. A dyeing of good evenness is obtained.

3.—At 75° C. to 85° C., 150 parts of sodium monochloracetate in the form of an aqueous solution of about 30 per cent. strength are introduced in the course of 1½ hours, while stirring, into 350 parts of an amine prepared by transformation of a hardened fish oil fatty acid of the iodine number 60 into the corresponding nitrile and reduction of this nitrile to the amine. The whole is allowed to cool and caustic soda solution is added until the reaction is alkaline to phenolphthalein. At 70° C., further 60 parts of sodium monochloracetate are added in the form of a solution of about 30 percent. strength. Caustic soda solution is then added until the reaction is again alkaline to phenolphthalein. At 60° C. to 70° C., 320 parts of dimethylsulfate and 250 parts of caustic soda solution of about 45° Bé. are run in, while stirring, and the whole is stirred for 10 hours at this temperature. A water-soluble mass is obtained which has the following constitution:

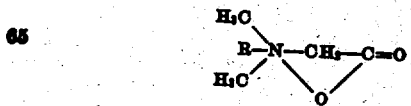

wherein R stands for the hydrocarbon radical which is contained in the fish oil fatty acid.

The product thus obtained is adapted as washing agent, especially in an alkaline solution, for cleansing textiles soiled with oils and pigments. By dissolving, for instance, 2 grams of the product in 1 liter of water of 35° (German) hardness, a solution is obtained which is very well adapted for washing linen and underwear. With the same good result the solution may also be used for washing crude wool containing suint and for washing piece goods.

We claim:

1. The products of the following general formula:

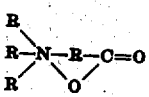

wherein R stands for an aliphatic radical with at least 6 carbon atoms and the other R's stand for a member of the group consisting of aliphatic, aliphatic-aromatic or aromatic radicals, which products are distinguished by their cleansing properties, their stability towards acids and lyes and towards the salts that cause the hardness of water.

2. The products of the following general formula:

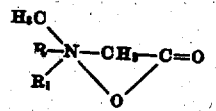

wherein R stands for an aliphatic radical with at least 6 carbon atoms and $R_1$ stands for alkyl, which products are distinguished by their cleansing properties, their stability towards acids and lyes and towards the salts that cause the hardness of water.

3. The product of the following formula:

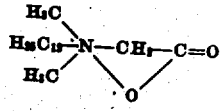

which product is distinguished by its cleansing properties, its stability towards acids and lyes and towards the salts that cause the hardness of water.

4. The product of the following formula:

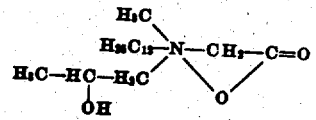

which product is distinguished by its cleansing properties, its stability towards acids and lyes and towards the salts that cause the hardness of water.

5. The product of the following general formula:

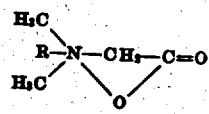

wherein R stands for the hydrocarbon radical of fish oil fatty acid, which product is distinguished by its cleansing properties, its stability towards acids and lyes and towards the salts that cause the hardness of water.

KARL DAIMLER.
CARL PLATZ.

DISCLAIMER 2,082,275.—*Karl Daimler* and *Carl Platz*, Frankfort-on-the-Main, Germany. SUBSTITUTED BETAINES. Patent dated June 1, 1937. Disclaimer filed August 4, 1938, by the assignee, *General Aniline Works, Inc.*

Hereby enters this disclaimer of all compounds coming within the scope of claim 1 with the exception of those in which the radical R, joining the N atom and the

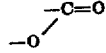

group, contains less than seven carbon atoms.
[*Official Gazette August 30, 1938.*]